US010198272B2

(12) United States Patent
Lewis (10) Patent No.: US 10,198,272 B2
(45) Date of Patent: Feb. 5, 2019

(54) FIRMWARE DISPLAY OF PAIRED BLUETOOTH STATUS INFORMATION DURING BOOT (71) Applicant: Insyde Software Corp., Taipei (TW)

(72) Inventor: Timothy A. Lewis, El Dorado Hills, CA (US)

(73) Assignee: Insyde Software Corp., Taipei (TW)

( * ) Notice: Subject to any disclaimer, the term of this patent is extended or adjusted under 35 U.S.C. 154(b) by 313 days.

(21) Appl. No.: 15/057,940

(22) Filed: Mar. 1, 2016

(65) Prior Publication Data
US 2016/0259650 A1 Sep. 8, 2016

Related U.S. Application Data (60) Provisional application No. 62/127,079, filed on Mar. 2, 2015.

(51) Int. Cl.
*G06F 9/4401* (2018.01)
*H04W 4/80* (2018.01)
*H04W 4/00* (2018.01)
*H04W 12/08* (2009.01)

(52) U.S. Cl.
CPC .......... *G06F 9/4411* (2013.01); *G06F 9/4401* (2013.01); *H04W 4/008* (2013.01); *H04W 4/80* (2018.02); *H04W 12/08* (2013.01)

(58) Field of Classification Search
CPC .... G06F 9/4401; G06F 9/4411; G06F 9/4415; H04W 4/80; H04W 12/08
See application file for complete search history.

(56) References Cited

U.S. PATENT DOCUMENTS

| 7,165,171 | B2* | 1/2007 | Zhang | G06F 9/4401 710/10 |
|---|---|---|---|---|
| 8,909,909 | B2* | 12/2014 | Ziarnik | G06F 9/4401 710/10 |
| 2007/0294556 | A1* | 12/2007 | Wutka | G06F 3/038 713/324 |
| 2008/0248748 | A1* | 10/2008 | Sangster | G06F 3/0231 455/41.2 |
| 2008/0280559 | A1* | 11/2008 | Dandekar | H04W 12/04 455/41.2 |
| 2014/0136828 | A1* | 5/2014 | Lewis | G06F 9/4416 713/2 |
| 2014/0181500 | A1* | 6/2014 | Mann | G06F 9/4416 713/2 |
| 2017/0249160 | A1* | 8/2017 | Lo | H04W 4/80 |

OTHER PUBLICATIONS

Bluetooth Specification, Hands-Free Profile 1.6. Telephony Working Group. 126 pages, May 10, 2011.
Wikipedia, Bluetooth, Pairing and bonding. 24 pages, Dec. 4, 2014. Retrieved online at: https://web.archive.org/web/20141205214235/http://en.wikipedia.org/wiki/bluetooth.

* cited by examiner

*Primary Examiner* — Glenn A. Auve
(74) *Attorney, Agent, or Firm* — McCarter & English, LLP; John S. Curran (57) ABSTRACT A firmware-based technique for retrieving and displaying status information from a paired Bluetooth™ device during a boot sequence for a computing platform is discussed. The retrieved status information for the paired device may be displayed in a text or graphical format.

20 Claims, 6 Drawing Sheets

FIRMWARE DISPLAY OF PAIRED BLUETOOTH STATUS INFORMATION DURING BOOT

RELATED APPLICATION

This application claims the benefit of, and priority to, U.S. Provisional Patent Application No. 62/127,079, entitled "Firmware Display of Paired Bluetooth Status Information During Boot", filed Mar. 2, 2015 the content of which is incorporated herein by reference in its entirety.

BACKGROUND

Computing devices are initialized by firmware included within the device and this firmware provides a range of software services which facilitate the boot of the operating system (OS) as well as providing a smaller subset of these services that continue to be available after the operating system has booted. Firmware is software that has been written onto Read-Only Memory (ROM) modules including, but not limited to, ROM, PROM, EPROM, EEPROM and Flash ROM (collectively referred to hereafter as "ROM"). Among other services, the firmware is responsible for operation of the computing device until a boot process can be run which loads an operating system for the computing device into memory. Once loaded, the operating system is in charge of normal operation of the computing device although the provision of certain services after loading of the operating system may require a transition of control from the operating system back to the firmware for security and other reason.

Unified Extensible Firmware Interface (UEFI) is a specification created by a non-profit industry body detailing a programming interface between the Operating System and the included firmware of a computing device such as, but not limited to, a Personal Computer (PC). UEFI specifications describe a set of tools by which a computing device can move in an organized fashion from the power-applied state to fully operational. The UEFI specification tells the desired result but deliberately does not specify the internal tactic of implementation. The UEFI firmware specification replaces earlier OS/firmware interfaces previously used by the industry and commonly known as legacy BIOS.

When implemented in a computing device, the machine codes for UEFI firmware and all permanent data used by the firmware reside in ROM. In many cases the ROM is an Electrically Erasable silicon device known as a flash ROM. Flash ROM has the characteristic that it can be erased by electrical command and individual elements may then be written and the device will retain the data indefinitely. When power is first applied to the computing device, the system executes a process called reset which clears the state to a known condition and begins execution of the firmware. The firmware is read from the flash ROM or other ROM in the computing device.

BRIEF SUMMARY

Embodiments of the present invention provide a firmware-based mechanism for retrieving and displaying status information from a paired Bluetooth™ device during a boot process for a computing platform and/or during the execution of a firmware setup program for the computing platform. The retrieved information may be displayed in a text or graphical format. The information may include Bluetooth™ status indicators for the paired device such as a battery status, a text or a phone message indicator, a signal strength, a roaming status or may display other information, such as indicating a presence of an application on the paired device.

In one embodiment, a firmware-implemented method for displaying status information for a paired Bluetooth™ device during a boot sequence on a computing platform includes identifying, during the boot sequence, at least one paired device listed in a link key database for the computing platform. The link key database holds information identifying devices that previously established a Bluetooth™ pairing with the computing platform. The method also determines that the at least one paired device listed in the link key database is in range of the computing platform and establishes a connection between the computing platform and the at least one paired device. The method additionally retrieves information from the at least one paired device to the computing platform and displays the retrieved information.

In another embodiment, a computing platform with improved boot sequence display capabilities includes a processor, a Bluetooth™ transceiver, and firmware. The firmware includes a paired device status information module. When executed, the paired device status information module causes the computing platform to identify, during the boot sequence, at least one paired device listed in a link key database for the computing platform. The link key database holds information identifying devices that previously established a Bluetooth™ pairing with the computing platform. Execution of the paired device status information module further causes the computing device to determine that the at least one paired device listed in the link key database is in range of the computing platform and to establish a connection between the computing platform and the at least one paired device. The paired device status information module further retrieves information from the at least one paired device to the computing platform and displays the retrieved information.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

The boot sequence for a computing platform may be informally divided into an initial period of firmware execution prior to beginning the loading of an operating system into memory and then a subsequent period where the operating system is loaded into memory by the firmware. While the initial firmware boot process is not long, the operating system boot process where the operating system is loaded into memory and assumes control of the computing platform takes a longer amount of time. With current operating systems, the display that the firmware displays on the computing platform's screen is maintained during the operating system loading process. Embodiments of the present invention take advantage of this time period by giving the firmware the ability to optionally display paired device status information during the boot process including during OS loading. Rather than have the user consult their phone or other Bluetooth™ device to see if any important events are going on, the computing platform's firmware automatically communicate with a paired Bluetooth™ device to retrieve status information. The retrieved information is displayed so that the user stays informed even across reboots and power-ons of the computing platform.

Figure 1:
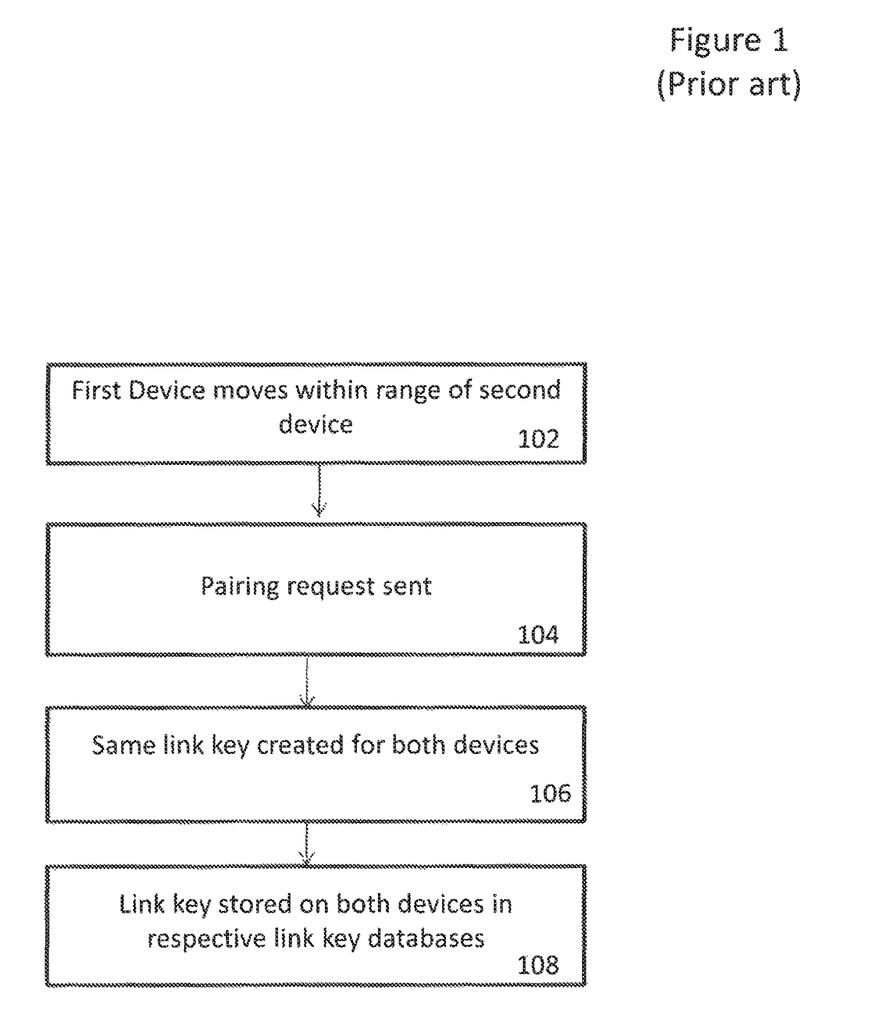
FIG. 1 (Prior art) depicts an exemplary sequence of steps performed by two devices to establish a Bluetooth™ pairing.

The Bluetooth™ pairing and bonding process and the process of establishing communication with a specific profile is well known. FIG. 1 (Prior art) depicts an exemplary sequence of steps performed by two devices to initially establish a Bluetooth™ pairing. A first and second device, both equipped with Bluetooth™ transceivers, pass within range of each other (step 102). A typical range over which a Bluetooth™ radio signal is expected to operate is 10 meters or less. The first device sends a pairing request to the second device (step 104). If the second device is accepting connections, the two devices create a shared secret known as a link key (step 106). A communication link, which may be encrypted, is then established between the two devices. The link key is used in subsequent contact between the two devices to first authenticate the other device before resuming communication. Both the first and second device respectively store their copy of the link key in a local link key database along with a reference to a MAC address or other device ID for the other device (step 108).

Embodiments of the present invention utilize a link key database for the computing platform that holds information identifying devices that have previously established a Bluetooth™ pairing with the computing platform. More particularly, the link key database may contain a MAC address (used as a device ID) and associated link key for a paired device that is accessible to the firmware during the boot environment. In one embodiment, during the boot sequence for the computing platform, a specialized firmware module, a paired device status information module, checks the link key database for the computing platform during the boot sequence for records of paired Bluetooth™ devices. If there are any devices listed in the link key database, then the paired device status information module initializes the Bluetooth™ controller, if it is not already initialized, and a search is performed with the controller to see if there are currently any Bluetooth™ devices in range that are paired with the current platform. If the devices in range are paired with the computing platform (i.e. listed in the link key database for the computing platform), then a connection with the found device is attempted. Once a connection is successfully established, current status information for the paired device is retrieved to the computing platform using the Hands Free Protocol or another Bluetooth™ protocol, including those proprietary to a specific OEM. For example, the list of services supported on a device can be discovered using the Service Discovery Protocol (SDP) or Low Energy Attribute Protocol (ATT). The Generic Attribute Profile (GAAT) describes how to exchange all profile and user data with Bluetooth™ devices, including status information. After the status information from the paired device is retrieved the connection may be shut down to reduce power consumption if it is no longer needed.

Figure 2:
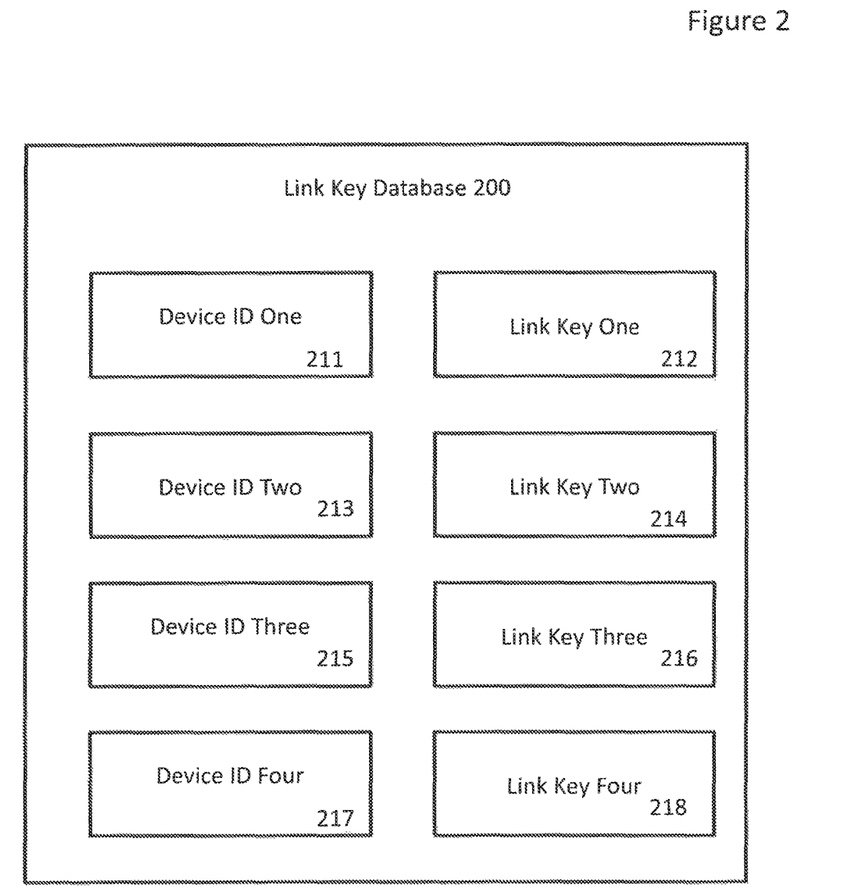
FIG. 2 depicts an exemplary link key database holding paired device information.

The link key database for a computing platform will frequently have records stored for multiple devices that have previously paired with the computing platform. FIG. 2 depicts an exemplary link key database holding paired device information. The link key database 200 for a computing platform holds records for four devices that have previously paired with the computing platform. More particularly, the record for a first device may include the combination of device ID one 211 (which may be a MAC address from the paired device) and an associated link key 212 that was created as a shared secret for the computing platform and device one at the time of the initial pairing request. Similar records for three additional devices that have also previously paired with the computing platform may also be included in the link key database 200. Thus the link key database also holds records for a second device (device ID two 213 and link key two 214), a third device (device ID three 215 and link key three 216) and a fourth device (device ID four 217 and link key four 218). It will be appreciated that the depiction of records for four devices in the exemplary link key database 200 is made for illustration purposes and the actual number of records in the link key database of the present invention may include a greater or lesser number of records.

The UEFI Platform Initialization Specification defines a typical boot flow process engaged in by Platform Initialization (PI) firmware to boot a UEFI BIOS-equipped computing device. A typical boot code flow in PI firmware passes through a succession of phases, in the following order:
1. Security (SEC) phase;
2. Pre-EFI Initialization (PEI) phase;
3. Driver Execution Environment (DXE) phase;
4. Boot Device Selection (BDS) phase;
5. Runtime phase;
6. Afterlife (AL) phase.

Figure 3:
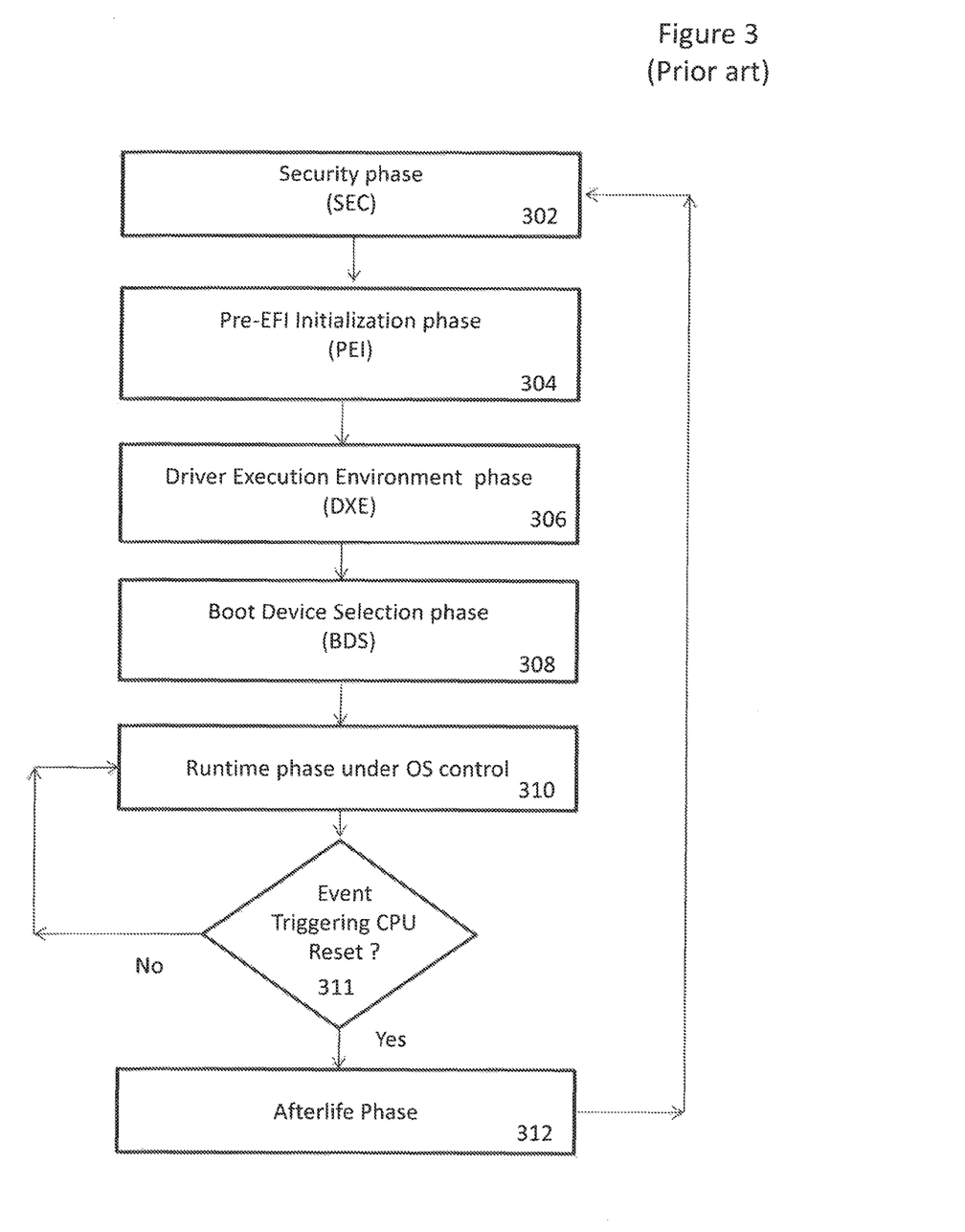
FIG. 3 (Prior art) depicts an exemplary boot sequence in a computing platform.

FIG. 3 (Prior art) depicts an exemplary boot sequence in a computing platform. The exemplary boot sequence begins execution at the CPU reset vector with the SEC phase firmware beginning execution (step 302). The CPU reset vector is the default location from which the CPU will retrieve the first instruction for execution following a CPU reset. The SEC phase extends from the time of CPU reset until temporary RAM is available. Among other duties, the SEC phase handles platform restart events, creates a temporary memory store, for example by using processor cache as flat memory, and hands pointers to the temporary memory, temporary stack and a Boot Firmware Volume (BFV) to the PEI phase. The PEI phase (step 304) initializes memory for the DXE phase to start using drivers known as PEI modules (PEIM) which are contained in the BFV provided by the SEC phase. The final module executed in the PEI phase, called the driver execution environment initial program loader (DXE IPL) or (DXE Initial Program Load) transitions operation to the DXE phase. The DXE phase (step 306) initializes the system components such as chipsets and add-on cards. The BDS (boot device selection) phase (step 308) selects a boot device from which to load an operating system and then loads the OS into memory. The runtime phase (step 310) refers to the time following completion of a boot sequence when the operating system has been loaded into memory and taken control of the computing device. The AL phase (step 312) occurs when the computing device's firmware takes control back from the operating system after the operating system has shut down, for example as a result of a transition by the computing device to a low power state (step 311) such as a sleep state, and before a CPU reset occurs.

Embodiments of the present invention execute a specialized firmware module, the paired device status information module, to retrieve and display status information from a paired Bluetooth™ device that is in range during the boot sequence. The paired device status information module may execute during the DXE phase of the boot sequence and displays the retrieved information at least until the beginning of OS loading during the BDS phase. As explained further below, in some embodiments the retrieved information may be displayed until the end of the BDS phase when OS loading has completed and beyond until OS login. Further, in some embodiments the retrieved information may be passed to an operating system process for display during runtime or displayed as part of a firmware setup menu utility.

In one embodiment, following retrieval of information from the paired device earlier in the boot sequence, the retrieved information from the paired device is used to generate a status display during the Boot Manager (BDS) phase of the boot when the display is being created. This display may be in conjunction with other splash screen information, such as a logo or other bitmap. The status information may include a text string describing the status (such as "Battery Low") or an icon (such as a battery meter icon) or a combination of both (such as a battery meter icon overlaid with numeric text indicating the amount of battery level remaining). The status information may also include the name of the paired device(s) such as that retrieved from the Device ID Profile (DIP). In one embodiment, the same sort of information may be displayed on a secondary display, such as an LCD panel with which the computing platform is in communication. In another embodiment, the same sort of information may be displayed in the computing platform's setup utility, along with a user interface required to pair a specific device.

Figure 4:
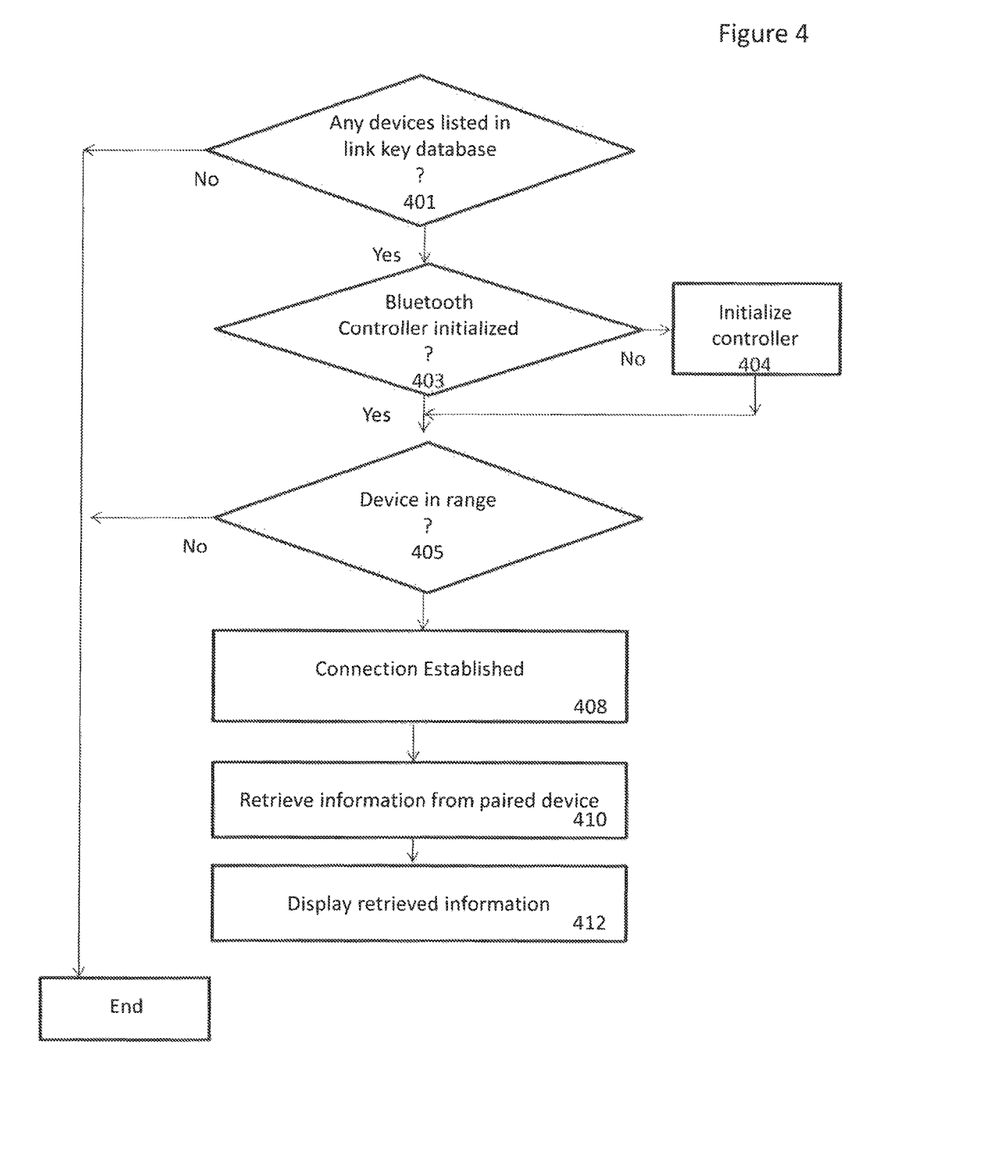
FIG. 4 depicts an exemplary sequence of steps performed by an embodiment of the present invention to retrieve and display paired device status information.

FIG. 4 depicts an exemplary sequence of steps performed by an embodiment of the present invention to retrieve and display paired device status information. The boot sequence for the computing platform begins and the paired device status information module in the computing platform's firmware determines whether there are any paired devices listed in the link key database (step 401). If there are no devices listed in the link key database, the module exits and the boot sequence continues in a normal manner. If there are paired devices listed in the link key database module (step 401), the paired device status information module checks to see if the Bluetooth™ controller has already been initialized by the boot sequence being performed by the computing platform (step 403). If the controller has not been initialized, the paired device status information module sends commands to initialize the controller step 404. Once the Bluetooth™ controller has been confirmed as initialized (steps 403 and/or 404), the paired device status information module checks to see if any of paired devices listed in the link key database are in range (i.e.: Bluetooth™ communication range) of the computing platform (step 405). If so, a connection is established with the in-range paired device (step 408) and information, such as device status information or other information, is retrieved by the computing platform from the paired device (step 410). The information may be retrieved using the Hands Free Protocol or another Bluetooth™ protocol. Typically, after the different types of services have been discovered using the SDAP (Service Discovery Application Profile), the attributes of the devices may be retrieved using the Generic Attribute Profile (GATT). The GATT describes specific ways in which the Attribute Transfer Protocol (ATT) is used to read notifications, get device characteristics and set device characteristics. The exact characteristics and notifications supported depend on the type of service(s) supported by the device. For example, a Bluetooth™-conformant Blood Pressure monitor that supports the Blood Pressure Service (BPS) exposes Blood Pressure Measurement characteristics (and others) that can be retrieved using the "Read Characteristic Descriptors" sub-procedures. Sub-procedures are specific commands provided by the GATT. Once the information has been retrieved to the computing platform it is then displayed to the user (step 412) during the remainder of the boot sequence until such time as the firmware loses the ability to write to the display at the end of the sequence as the operating system is being loaded.

In one embodiment, suitable for use on computing platforms compliant with the Advanced Configuration and Power Interface (ACPI), the time for displaying the retrieved information to a user may be extended to take place until the end of the boot sequence. The ACPI specification defines a standard for device configuration and power management to be implemented by the operating system (OS) in computing platforms. The ACPI is a robust interface between firmware, operating systems (OSes) and devices that provides management of hardware functions at runtime. The core ACPI-configurable functions include device discovery, thermal management, general UEFI boot capability, OS configuration and power management (OPSM) and reliability, availability and supportability (RAS) features. Use of the ACPI improves system power distribution and conservation. If the computing platform generates a BGRT (Boot Graphics Resource Table) as described by the ACPI specification, the image that this table refers to is also updated by the paired device status information module with the retrieved status information. The OS continues to present the image to which this table refers after BDS has completed and until the time it is ready to display its login screen or desktop.

Figure 5:
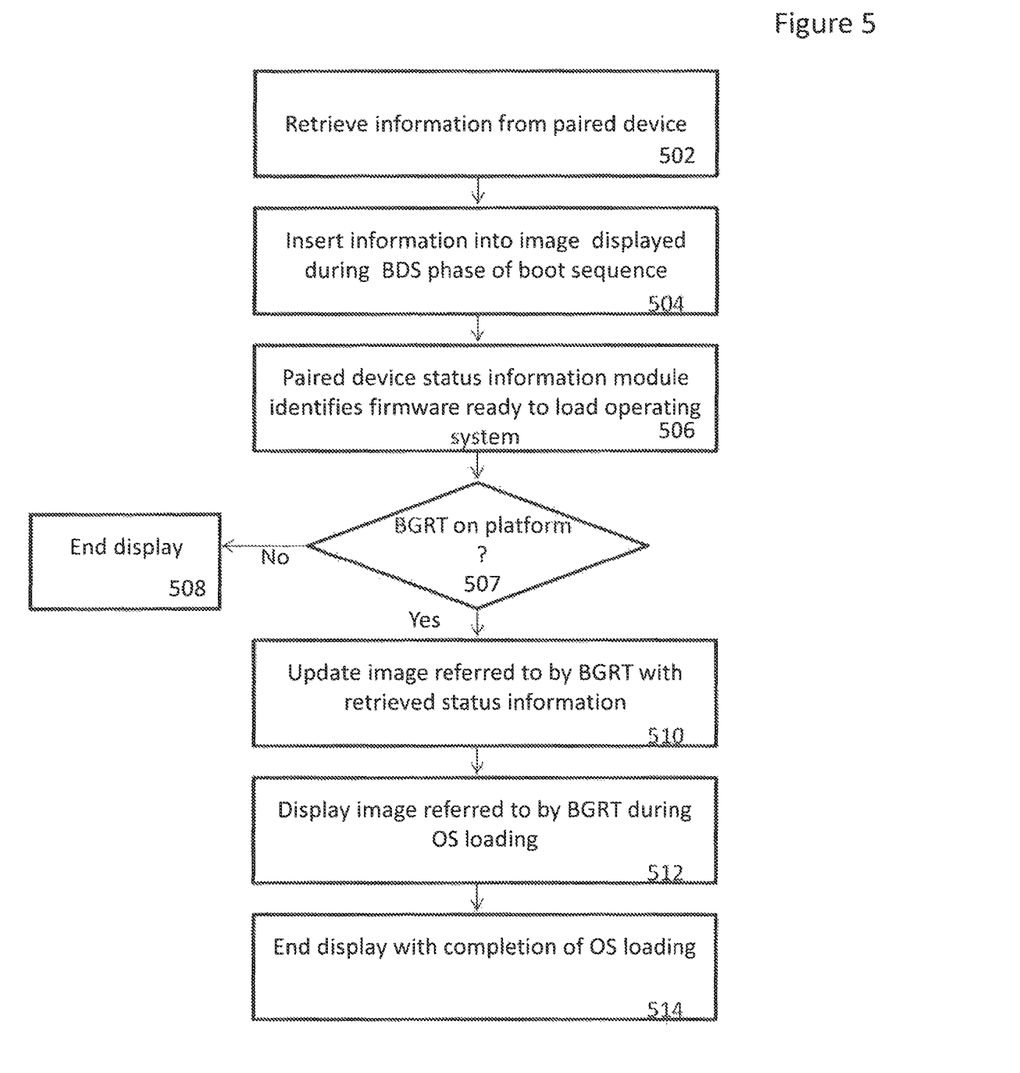
FIG. 5 depicts an exemplary sequence of steps performed by an embodiment of the present invention to display paired device status information until the end of the boot sequence.

FIG. 5 depicts an exemplary sequence of steps performed by an embodiment of the present invention to display paired device status information until the end of the boot sequence. The exemplary sequence begins the retrieval of information from the paired device by the paired device status information module (step 502). The retrieved information is inserted into the image being displayed during the BDS phase of the boot sequence. For example, the retrieved information may be inserted into an image for a splash screen. Later in the BDS phase, when the paired device status information module detects that the operating system is ready to be loaded into memory (step 506) and the firmware is accordingly about to lose its ability to write to the display, the paired device status information module of the present invention determines whether the computing platform has generated a BGRT (step 507). If there is no BGRT available (step 507), the display of the retrieved information ends (step 508). Alternatively, if there is a BGRT available (step 507), the paired device status information module updates the image referred to by the BGRT (step 510). The updated image referred to by the BRGT is then utilized by the OS loader that is loading the operating system into memory, using an OS driver that has already been loaded into memory and started execution during the loading process, to display the retrieved information in the updated image during the remainder of the boot sequence completing the loading of the operating system. The display of the retrieved information ends with the completion of the boot sequence (step 512).

In another embodiment the displayed text/icon(s) can be embedded in the image passed to the operating system during the boot process. As a result, the image and the retrieved information is available for display once the operating system has assumed control of the computing platform, i.e.: at runtime. In one embodiment, the firmware setup utility can display the retrieved information from the paired device as well, along with more detail, and allow the user to initiate actions such as finding the phone by using signal strength and ring-out capabilities. In another embodiment, the status information may be embedded in a pre-existing image.

Figure 6:
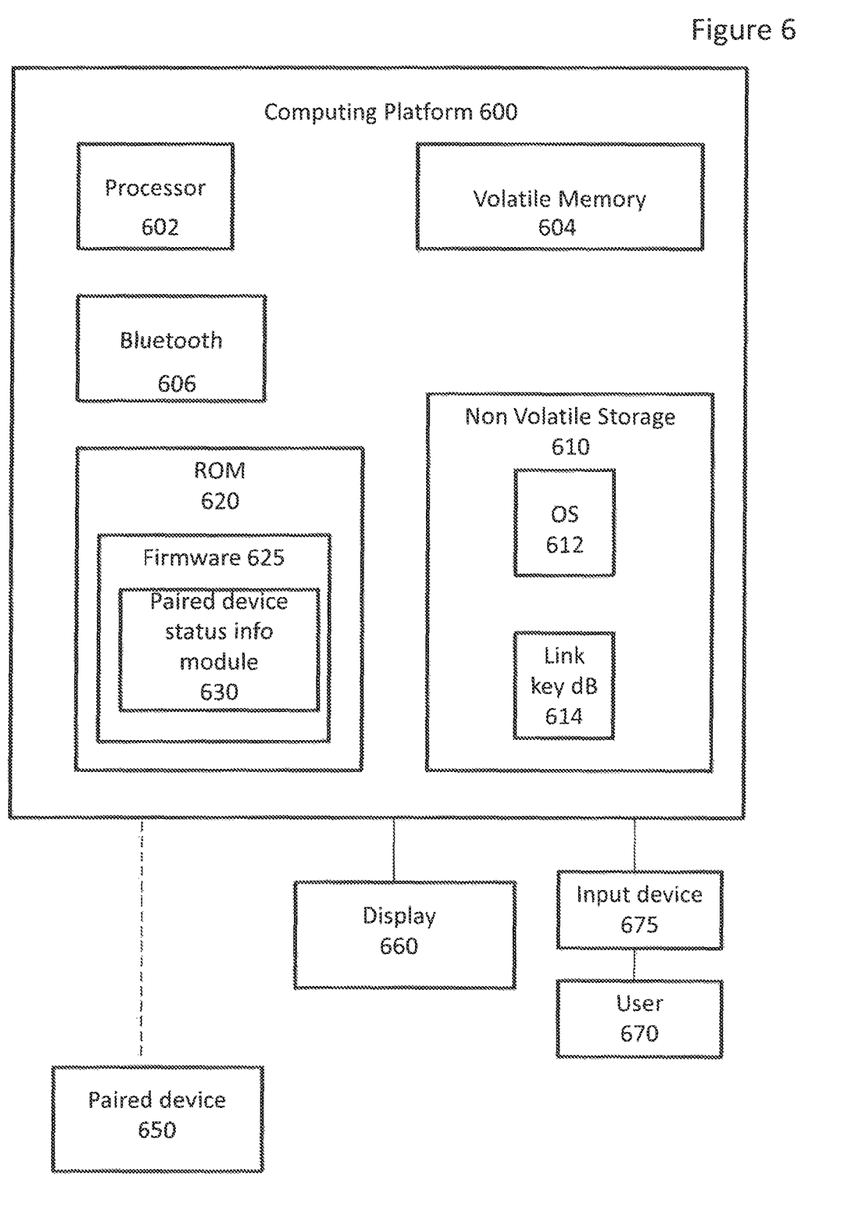
FIG. 6 depicts an exemplary environment suitable for practicing an embodiment of the present invention.

FIG. 6 depicts an exemplary computing environment suitable for practicing an embodiment of the present invention. A computing platform 600 includes a processor 602 such as, but not limited to a central processing unit (CPU), and volatile memory such as random access memory (RAM) 604. Computing platform 600 includes Bluetooth™ transceiver 606 used to send and receive Bluetooth™ communications. The computing platform 600 may also include non-volatile storage 610 such as a hard drive holding an operating system (OS) 612. Non-volatile storage may also hold link key database 614 which is consulted during the boot sequence by embodiments of the present invention. Link key database 614 may hold a device ID such as a MAC address and link key for one or more paired devices. It will be appreciated that link key database 614 may also be located in another location accessible to the platform firmware from the boot environment. The computing platform 600 may also include Read Only Memory (ROM) 620 holding platform firmware 625. Firmware 625 may be executed during a boot sequence for the computing platform 600 (as well as at other times) and may load OS 612 into volatile memory 604 for execution. Firmware 625 may include paired device status information module 630 operable during the boot sequence as described herein to retrieve status information from a paired device.

A user 670 may utilize an input device 675 such as a keyboard or touch screen to interact with computing platform 600 and may view information associated with paired device 650 on display 660. In one embodiment, the information may be status information for the paired device that is embedded in a pre-existing image. Display 660 may be integrated into computing platform 600 or may be a separate display surface.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

We claim:

1. A firmware-implemented method for displaying status information for a paired Bluetooth™ device during a boot sequence on a computing platform, comprising:
   identifying, during the boot sequence, at least one paired device listed in a link key database for the computing platform, the link key database holding information identifying devices previously establishing a Bluetooth™ pairing with the computing platform;
   determining that the at least one paired device listed in the link key database is in range of the computing platform;
   establishing a connection between the computing platform and the at least one paired device;
   retrieving information from the at least one paired device to the computing platform; and
   displaying the retrieved information.

2. The method of claim 1 further comprising:
   displaying the retrieved information during the boot sequence before a loading of an operating system into memory commences.

3. The method of claim 1 further comprising:
   displaying the retrieved information during the boot sequence after a loading of an operating system into memory commences.

4. The method of claim 3 further comprising:
   updating an image referred to by a Boot Graphics Resource Table (BGRT) in the computing platform based on the retrieved information.

5. The method of claim 1 wherein the retrieved information is status information for the at least one paired device.

6. The method of claim 5 wherein the status information is at least one of a battery level, a signal strength, a text message indicator, a phone message indicator, a roaming status and an application presence.

7. The method of claim 5 wherein the retrieved information is displayed as one of a text string, an icon and a combination of text string and an icon by the computing platform.

8. The method of claim 1 wherein the retrieved information is embedded in an image passed to an operating system during the boot process and is available for display by the operating system during runtime.

9. The method of claim 1, further comprising:
   displaying the retrieved information in a setup utility of the computing platform.

10. A non-transitory medium holding computer-executable firmware instructions for displaying status information for a paired Bluetooth™ device during a boot sequence on a computing platform, the firmware instructions when executed causing the computing platform to:
    identify, during the boot sequence, at least one paired device listed in a link key database for the computing platform, the link key database holding information identifying devices previously establishing a Bluetooth™ pairing with the computing platform;
    determine that the at least one paired device listed in the link key database is in range of the computing platform;
    establish a connection between the computing platform and the at least one paired device;

retrieve information from the at least one paired device to the computing platform; and display the retrieved information.

11. The medium of claim 10 wherein the firmware instructions when executed further cause the computing platform to:

display the retrieved information during the boot sequence before a loading of an operating system into memory commences.

12. The medium of claim 10 wherein the firmware instructions when executed further cause the computing platform to:

display the retrieved information during the boot sequence after a loading of an operating system into memory commences.

13. The medium of claim 12 wherein the firmware instructions when executed further cause the computing platform to:

update an image referred to by a Boot Graphics Resource Table (BGRT) in the computing platform based on the retrieved information.

14. The medium of claim 10 wherein the retrieved information is status information for the at least one paired device.

15. The medium of claim 14 wherein the status information is at least one of a battery level, a signal strength, a text message indicator, a phone message indicator, a roaming status and an application presence.

16. The medium of claim 14 wherein the retrieved information is displayed as one of a text string, an icon and a combination of text string and an icon by the computing platform.

17. The medium of claim 10 wherein the retrieved information is embedded in an image passed to an operating system during the boot process and is available for display by the operating system during runtime.

18. The medium of claim 10 wherein the firmware instructions when executed further cause the computing platform to:

display the retrieved information in a setup utility of the computing platform.

19. A computing platform with improved boot sequence display capabilities, comprising:

a processor;

a Bluetooth™ transceiver; and firmware, the firmware including a paired device status information module, the paired device status information module when executed causing the computing platform during the boot sequence to:

identify, during the boot sequence, at least one paired device listed in a link key database for the computing platform, the link key database holding information identifying devices previously establishing a Bluetooth™ pairing with the computing platform;

determine that the at least one paired device listed in the link key database is in range of the computing platform;

establish a connection between the computing platform and the at least one paired device;

retrieve information from the at least one paired device to the computing platform; and display the retrieved information.

20. The computing platform of claim 19, further comprising:

a Boot Graphics Resource Table (BGRT), the BGRT referencing an image, the image updated based on the retrieved information, wherein the updated image is displayed by the computing platform during the boot sequence while an operating system is being loaded into memory.

* * * * *